United States Patent [19]
Kato

[11] Patent Number: 4,726,732
[45] Date of Patent: Feb. 23, 1988

[54] CONVEYING APPARATUS FOR CEILING-SUSPENDED INDUSTRIAL ROBOT
[75] Inventor: Hisao Kato, Aichi, Japan
[73] Assignee: Mitsubishi Denki Kabushiki Kaisha, Tokyo, Japan
[21] Appl. No.: 839,393
[22] Filed: Mar. 14, 1986
[30] Foreign Application Priority Data
 Mar. 15, 1985 [JP] Japan .................................. 60-50533
[51] Int. Cl.⁴ ......................... B66C 5/00; B66C 11/00
[52] U.S. Cl. ............................. 414/744 A; 212/116; 901/8; 901/48
[58] Field of Search ............... 414/744 R, 744 A, 749, 414/751, 719, 735; 212/195, 196, 197, 232; 901/8, 48

[56] References Cited
U.S. PATENT DOCUMENTS
3,913,582 10/1975 Sharon .............................. 901/48 X
4,507,046 3/1985 Sugimoto et al. .................... 414/735
4,534,694 8/1985 Tuda ................................ 414/735
4,541,770 9/1985 Niinomi et al. ..................... 901/8 X Primary Examiner—Frank E. Werner
Assistant Examiner—Donald W. Underwood
Attorney, Agent, or Firm—Sughrue, Mion, Zinn, Macpeak, and Seas

[57] ABSTRACT

A conveying apparatus for an industrial robot in which a first arcuate rail is fixed to a ceiling and extends parallel to a turning locus of a robot arm suspended form a ceiling surface. A second linear rail is attached to the first rail and is rotatable therearound while maintaining an orientation normal to the first rail. A gripper mounted on a forward end portion of the robot arm is suspended by a balancer from the second rail, or alternatively by a first link having one end rotatably fixed to the ceiling and connected at its other end to one end of a second link with the gripper suspended by a wire from a balancer mounted on the other end of the second link. With this arrangement, not only is the vertical load due to objects conveyed by the robot reduced, but the horizontal load due to the same is also reduced, even in a horizontal conveying operation.

7 Claims, 5 Drawing Figures

CONVEYING APPARATUS FOR CEILING-SUSPENDED INDUSTRIAL ROBOT

BACKGROUND OF THE INVENTION

The present invention pertains generally to an industrial robot, and more particularly, to an apparatus for conveying heavy workpieces using a ceiling-suspended industrial robot.

Japanese Unexamined Patent Publication No. 60-9691 discloses an industrial robot, itself having a relatively small weight, which is adapted for moving more heavy workpieces suspended from a ceiling. In this robot, a balancer or the like having an elastic member such as a spring is employed to apply an upward force to the suspended workpiece.

An example of such a robot is illustrated in FIG. 1 of the drawings. As shown in FIG. 1, a robot 1 is mounted on a floor. The robot 1, a column 1a, an arm 1b, a gripper 2, etc., are operated in response to commands received from a control apparatus (not shown). In performing operations on a workpiece 4 disposed upon a work table 3, it is often necessary to exchange work tools 5 and 6 in switching between work steps. With this arrangement, even if the weight of the tools 5 and 6 exceeds the weight of the robot, the exchange of the tools can be smoothly effectd due to the operation of balancers 7 provided between the ceiling and the objects suspended therefrom, namely, the tools 5 and 6.

However, in this apparatus, there have been problems in that, although the load on the robot is reduced with the use of the balancers 7, a load exceeding the maximum permissible value may be applied to rotary portions of the robot during turning operations of the arm 1b or any rotating operation of the gripper 2. In such a case, an accident may occur due to wear, bending, or the like, and the service life of the robot 1 may be shortened.

More specifically, wires 8 and 9 for supporting the work tools 5 and 6 through the balancer 7 are fixed at their upper ends from the ceiling 10. However, bacause the upper ends of the wires 8 are fixed to the ceiling 10, specifically, at support points 11, when the gripper 2 causes the tool 5 or 6 to move above the workpiece 4 as shown in FIG. 1, the wires 8 and 9 are slantingly stretched. As a result, horizontal forces may be exerted on the gripper 2. Further, this horizontal force may also act on the arm 1b and the column 1a, causing an overload on the robot 1 as a whole.

SUMMARY OF THE INVENTION

Accordingly, it is a primary object of the present invention to provide an industrial robot in which the above-mentioned problems have been overcome.

More specifically, an object of the invention is to provide a conveying apparatus for an industrial robot in which not only vertical loads due to weights carried by the robot are reduced, but the horizontal load due to the same is reduced, even during horizontal conveying operations.

In accordance with the above and other objects of the invention, a conveying apparatus for an industrial robot is provided including a first arcuate rail disposed above a robot arm, extending parallel to a turning locus of the robot arm, and mounted on the body of the robot, a second rail movably fitted to the first rail and arranged to intersect the first rail, and gripper means mounted on the robot arm at its forward end portion and supported by an energizing member suspended from the second rail.

With this arrangement, the load applied to the robot when an object is to be conveyed vertically is absorbed or reduced by the balancer suspended from the second rail. Further, during horizontal conveying operations, the gripper means follows the movement of the forward end portion of the robot arm under the reduced-load condition throughout the range of movement of the first and second rails. Acordingly, excess horizontal forces are prevented from being exerted on any portion of the robot.

DESCRIPTION OF THE PREFERRED EMBODIMENTS

Figure 1:
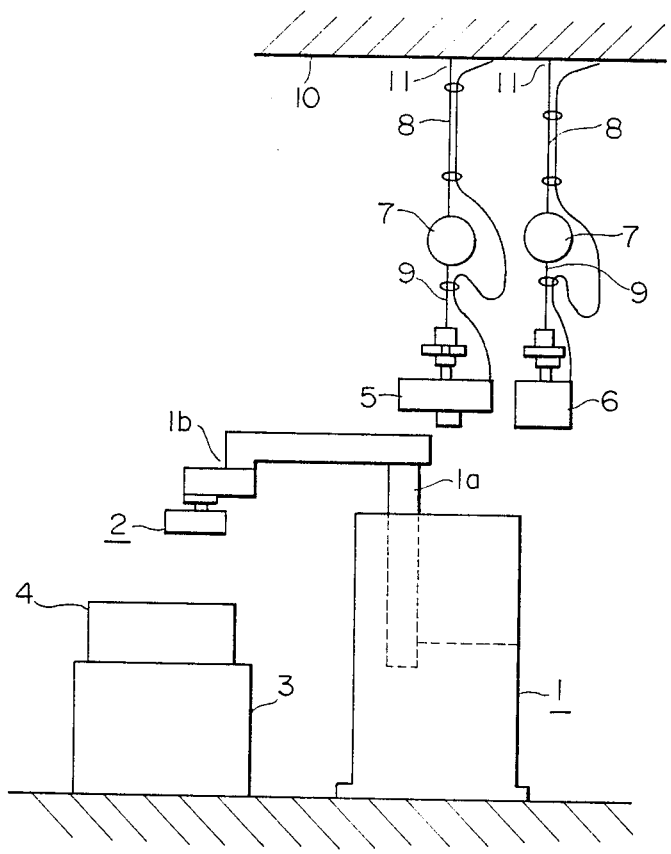
FIG. 1 is a schematic side view showing the arrangement of a conventional conveying apparatus using a balancer.
Figure 2:
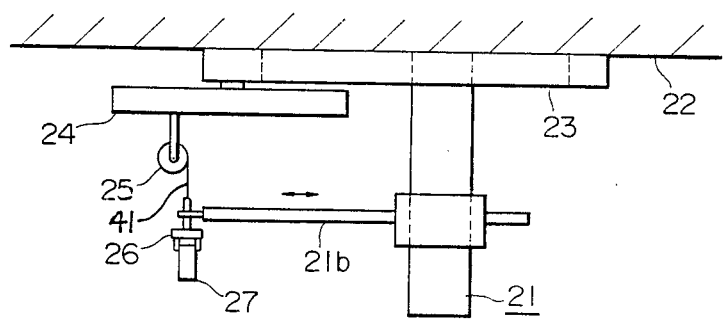
FIG. 2 is a side schematic view of a conveying apparatus of the invention.
Figure 3:
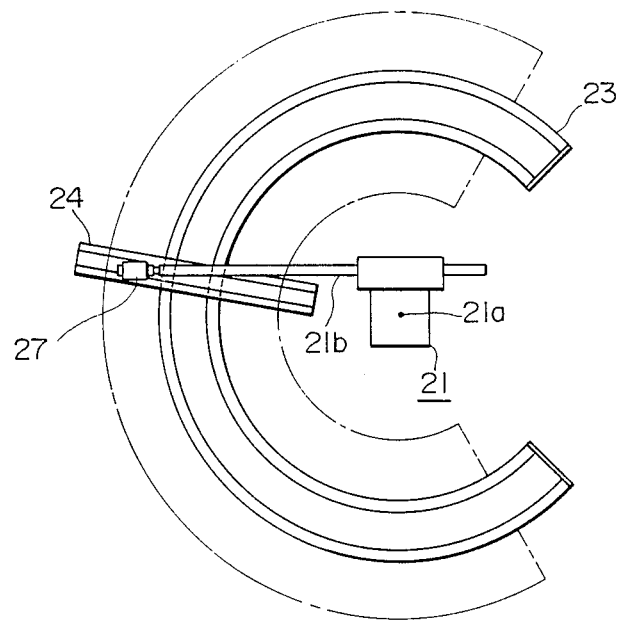
FIG. 3 is a bottom view of the apparatus of FIG. 2.

FIGS. 2 and 3 show the overall arrangement of a conveying apparatus of an industrial robot constructed in accordance with the present invention. In FIGS. 2 and 3, reference numeral 21 designates a robot body fixed to a ceiling surface 22 so as to be suspended therefrom. The robot further includes a robot arm 21b rotatably arranged around a rotational center 21a. The robot arm 21b is thereby movable in the radial direction. Further, reference numeral 23 designates a first, arcuate rail extending around the center 21a of the robot arm 21b. The rail 23 is also fixed to the ceiling surface 22. Reference numeral 24 indicates a second, linear rail extending in the radial direction of the first rail, that is, normally with respect to the first rail 23. The second rail 24 is arranged to be movable along the arc of the first rail 23 by means of a pulley or the like fitted on the first rail 23. A balancer 25 is suspended from the second rail 24 and is movable within the linear range of the second rail 24. A gripper 26, suspended from the balancer 25 through a connecting means or wire 41, is mounted on the robot arm 21b at the forward end portion of the latter. Reference numeral 27 indicates a workpiece held by the gripper 26.

When the thus-arranged industrial robot of the invention is to be used as a conveying apparatus, the balancer 25 and the gripper 26 follow the movement of the robot arm 21b within the conveying range of the robot 21, as indicated by a single-dot/chain line in FIG. 3. That is, when the robot arm 21b performs a conveying movement, the second rail 24 moves along the first rail 23 while being guided thereby and while maintaining its normal relationship with respect to the first rail 23. That is, the balancer 25 and the gripper 26 move along an arcuate path. When the robot arm 21b moves in the radial direction with respect to the turning center 21b of the robot 21, on the other hand, the balancer 25 and the gripper 27 move linearly along the second rail 24. Further, it is possible to perform a conveying operation in which both the above-described arcuate movement and the movement in the normal direction are employed.

Figure 4:
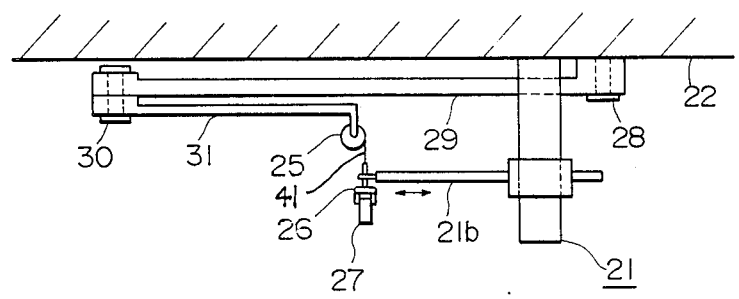
FIGS. 4 and 5 are a side view and a bottom view, respectively, of another preferred embodiment of the present invention.
Figure 5:
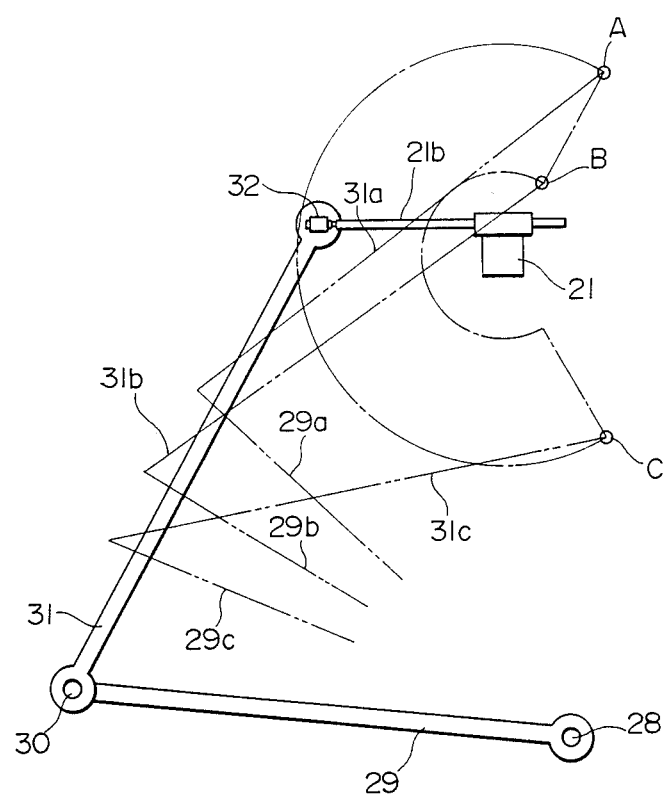

A second preferred embodiment of the invention will not be described with reference to FIGS. 4 and 5. In FIGS. 4 and 5, components which are common with those depicted in FIG. 2 are designated by like reference numerals, and further detail description thereof are therefore omitted.

In the embodiment of FIGS. 2 and 3, the gripper is suspended directly from the arcuate and linear rails. This arrangement is modified in the second embodiment.

More specifically, in the second embodiment, a first link 29 is rotatably fixed at one end to the ceiling surface 22 at a point 28. The other end of the first link 29 is rotatably connected to one end of a second link 31. A balancer 25 is mounted on the other end 32 of the second link 31, and a gripper 26 is suspended from the balancer 25 via a wire.

In operation, if the gripper 26 moves, for example, from a point A to a point C via a point B, the first and second links 29 and 31 move through respective positions 29a,31a, 29b,31b, and 29c,31c, as shown by two-dot/chain lines in FIG. 5. The same advantageous effects as those of the first embodiment are thereby obtained.

I claim:

1. In an industrial robot having an arm arranged to perform a turning movement within a predetermined plane, gripper means mounted on said arm for gripping an object, and energizing means for providing an upward energizing force for supporting at least a portion of the weight of said object, the improvement comprising:
   (a) means for connecting said energizing means to said gripper means for bearing at least a portion of a downward load applied to said gripper means; and
   (b) a supporting mechanism disposed above said arm and having a mounting portion supporting said energizing means, said supporting mechanism comprising first and second members, said second member being movably supported by said first member and including said mounting portion, and said first member comprising an arcuate member for permitting said mounting portion to move along an arcuate path.

2. The industrial robot according to claim 1, wherein said second member comprises a linear member intersecting said arcuate member for allowing said mounting portion to move in a direction normal to said arcuate member.

3. The industrial robot according to claim 2, wherein said connecting means comprises means for directly connecting said energizing means to said gripper means in such a manner that said energizing means may exert an upward energizing force on said gripper means having a magnitude determined in accordance with a load applied to said gripper means.

4. The industrial robot according to claim 2, wherein said robot comprises means for mounting said arm so that said arm can perform a turning movement about a predetermined center point and a radial movement with respect to said center point.

5. The industrial robot according to claim 2, wherein said arcuate member is a guiding rail which allows said linear member to move along an arcuate path while maintaining said linear member in an attitude to said normal arcuate member.

6. The industrial robot according to claim 5, wherein said linear member comprises a linear guiding rail which allows said mounting portion to move in a longitudinal direction of said linear member.

7. The industrial robot according to claim 2, wherein said supporting mechanism is mounted on a ceiling surface.

* * * * *